(12) United States Patent
Kammel et al.

(10) Patent No.: US 6,378,853 B1
(45) Date of Patent: Apr. 30, 2002

(54) RUBBER BEARING WITH CHARACTERISTIC BEHAVIOUR WHICH DIFFERS IN THE DIRECTION OF THE CIRCUMFERENCE

(75) Inventors: Helmut Kammel, Damme; Axel Sichler, Westerkappeln, both of (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/622,760

(22) PCT Filed: Nov. 26, 1999

(86) PCT No.: PCT/DE99/03756

§ 371 Date: Oct. 10, 2000

§ 102(e) Date: Oct. 10, 2000

(87) PCT Pub. No.: WO00/37821

PCT Pub. Date: Jun. 29, 2000

(30) Foreign Application Priority Data

Dec. 22, 1998 (DE) ............................. 198 59 067

(51) Int. Cl.$^7$ ............................................. F16F 13/00
(52) U.S. Cl. ...................................... 267/141.2; 207/292
(58) Field of Search ................. 267/141.2, 141.7, 267/140.5, 153, 219, 220

(56) References Cited

U.S. PATENT DOCUMENTS

| | | |
|---|---|---|
| 3,147,964 A | 9/1964 | Wolf |
| 3,467,421 A | 9/1969 | Bently |
| 4,817,926 A * | 4/1989 | Schwerdt ................. 267/141.2 |
| 5,005,811 A * | 4/1991 | Harrison et al. ......... 267/141.5 |
| 5,042,785 A | 8/1991 | LeFol et al. |
| 5,050,850 A * | 9/1991 | Noguchi et al. ....... 267/140.12 |
| 6,199,840 B1 * | 3/2001 | Yano ..................... 267/140.12 |

FOREIGN PATENT DOCUMENTS

| | | | |
|---|---|---|---|
| DE | GM 69 02 616 | 6/1969 | |
| DE | 4233705 * | 4/1994 | ............ 267/140.12 |
| FR | 1362638 * | 4/1963 | ............ 267/141.2 |
| FR | 2 256 346 | 7/1975 | |
| GB | 945860 | 1/1964 | |
| GB | 1185264 | 3/1970 | |
| GB | 2 018 948 A | 10/1979 | |
| GB | 2018948 * | 10/1979 | |
| JP | 405280579 * | 10/1993 | ............ 267/140.12 |

* cited by examiner

Primary Examiner—Matthew C. Graham
(74) Attorney, Agent, or Firm—McGlew and Tuttle, P.C.

(57) ABSTRACT

The present invention pertains to a rubber bearing with different characteristics in the circumferential direction, which is intended for being mounted in a cylindrical mount. The object is to provide a rubber bearing in which comparatively great differences in characteristics can be achieved in different directions and whose design is simplified compared with the prior-art bearings with different characteristics.

This object is accomplished by the outer contour of the cross-sectional area of the inner part having a shape deviating from the circular shape in the rubber bearing comprising an inner part and an elastomer with recesses, which said elastomer is connected to the inner part by vulcanization, and by the rubber height of the elastomer of the bearing mounted in the mounting eye varying corresponding to the cross section of the inner part, wherein the inner part always has its greatest radial extension in the area of the recesses and the elastomer, which has increased pretension in these areas, has its smallest rubber height in the area of the said recesses.

20 Claims, 5 Drawing Sheets

RUBBER BEARING WITH CHARACTERISTIC BEHAVIOUR WHICH DIFFERS IN THE DIRECTION OF THE CIRCUMFERENCE

FIELD OF THE INVENTION

The present invention pertains to a rubber bearing with different characteristics in the circumferential direction, which is intended for being mounted in a cylindrical mount.

BACKGROUND OF THE INVENTION

Rubber bearings of various designs are frequently used especially in the automobile industry. They are used especially in components for the wheel suspension, e.g., for mounting, the suspension arms. The bearings consist, in general, of a tubular inner part, which is surrounded by an elastomer and is connected to same by vulcanization. The bearing is mounted in an outer, likewise cylindrical tube section.

It is often desirable to design the bearings such that they have areas with different characteristics in their circumferential direction. To achieve this, recesses are provided in the elastomer. In the areas of these recesses, the bearing will then have a softer characteristic. However, the stress on the elastomer by radially introduced forces is particularly high as a result in the areas. To achieve a uniform transmission of forces and consequently to avoid the crushing of the rubber and to protect the elastomer from a premature wear by excessive stress, it is therefore necessary to stabilize the elastomer by appropriate measures. It is common practice for this to connect the elastomer to an outer part, which is designed as a cylindrical sleeve and consists of, e.g., aluminum or a plastic. This implies an increased manufacturing cost and is therefore disadvantageous for the manufacturing costs. In contrast, if no such stabilizing outer part is used, there will be relatively narrow limits in terms of the achievable characteristic ratio, i.e., the ratio of soft characteristic to hard characteristic, in the case of bearings of the conventional design. Characteristic differences of at most up to 20% are thus obtained, in general.

SUMMARY AND OBJECTS OF THE INVENTION

The primary object of the present invention is therefore to provide a rubber bearing in which comparatively great characteristic differences can be reached in different directions and whose design is simplified compared with the prior-art bearings with great differences between soft and hard characteristic.

According to the invention, a rubber bearing is provided with different characteristics in the circumferential direction. The bearing is intended for being mounted in a cylindrical mounting eye. The bearing comprises an inner part and an elastomer with an essentially cylindrical outer contour, which surrounds the inner part. The outer contour is connected to the inner part by vulcanization and has recesses in some areas to obtain circumferential sections with a softer characteristic. To accomplish the primary object, the outer contour of the cross-sectional area of the inner part has, contrary to its inner contour, a shape deviating from the circular shape. The height of the rubber of the elastomer of the bearing, which is mounted in the mounting eye without a stabilizing outer ring, varies corresponding to the cross section of the inner part, and the inner part has its greatest radial extension in the area of the recesses, and the elastomer, which has an increased pretension in these areas, has its smallest rubber height in the area of the recesses.

According to an embodiment of the present invention, the inner part has a rectangle-like cross-sectional shape, wherein the short sides of this rectangle-like shape are rounded and are designed as a circular segment, arched outwardly in the radial direction. As a result, the inner part will have a great major axis passing through the longitudinal central axis of the bearing and a minor axis extending at right angles thereto. In another possible embodiment, the inner part has the shape of an ellipse, which is flattened at the ends of its principal axis.

According to embodiments of the bearing according to the present invention that are relevant for practice, the ratio of the major axis to the minor axis is 3:2 or 26:17, as a result of which a characteristic ratio of 2:1 can be obtained. By selecting the ratio of the major axis to the minor axis of the inner part and an outer contour of the elastomer that is coordinated with this, different characteristic ratios can be obtained according to the present invention for the bearing.

Thus, while maintaining the basic principle according to the present invention, another advantageous embodiment of the rubber bearing is obtained by slightly modifying the outer contour of the elastomer, in addition to the changed shape of the inner part, by which the rubber height of the elastomer is increased such that the inner part with the elastomer has an external diameter that is greater before the mounting of the bearing than the internal diameter of the mounting eye. It is additionally possible to influence the characteristic ratio by providing locally limited, radially outwardly directed bulges in the elastomer in the vicinity of the recesses. As a result, the rubber height is additionally increased in the area of these bulges before the mounting of the bearing. The elastomer is pushed together in the area of the recesses due to the mounting in the mounting eye, so that the recesses become smaller and the elastomer has again its smallest rubber height in this area. During the intended use of the bearing, the bulges in the elastomer, which were visible before the mounting, act as a travel-limiting buffer against radially directed loads. In view of the fact that this also has a certain effect on the characteristics, it is thus conceivable that the characteristics of the bearing can be specifically influenced by the design of such buffers and their dimensioning. It is always essential for the present invention that the recesses are preserved independently from the outer contour of the elastomer and from the shape of the inner part in the mounted state and they form a cavity between the elastomer and the mount.

If increased pressure builds up as a result under the load of the bearing in a cavity formed by a recess because of the air present in it, a pressure equalization takes place via a channel between this cavity and the respective opposite recess, which channel is provided according to another advantageous embodiment. Thus, if the bearing is sealed correspondingly, it is also conceivable that a liquid damping agent, which can also escape through the channels corresponding to the particular load, can be additionally introduced into the cavities formed.

The rubber bearing according to the present invention has a markedly simplified design due to the elimination of the outer part. This also leads to a considerable advantage in terms of the cost of the bearing according to the present invention compared with prior-art comparable rubber bearings. Furthermore, the resulting weight reduction can be considered to be advantageous.

A very great variability is achieved concerning the characteristic ratios by designing the inner part correspondingly and by possibly additionally modifying the essentially cylindrical outer contour of the elastomer. It is thus possible to obtain, e.g., a characteristic ratio of 2:1, which was able to be accomplished in prior-art bearings only by the use of an outer part. In addition, the particular characteristic ratio can be favorably finely coordinated in a very simple manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
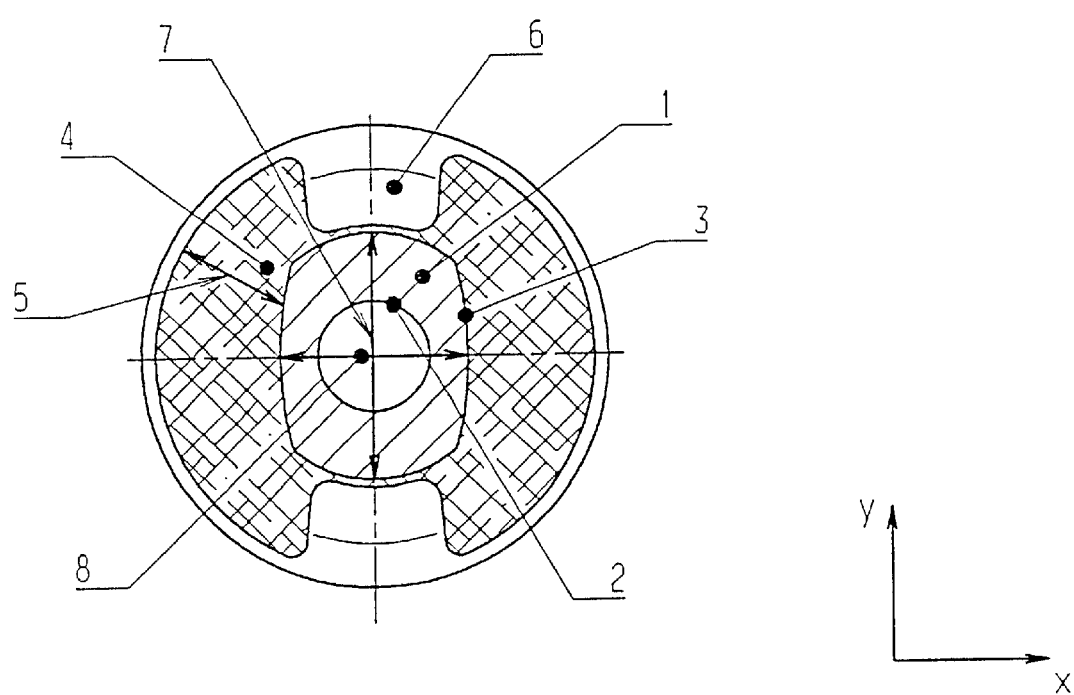
FIG. 1 is a schematic sectional view of a bearing according to the present invention.
Figure 4:
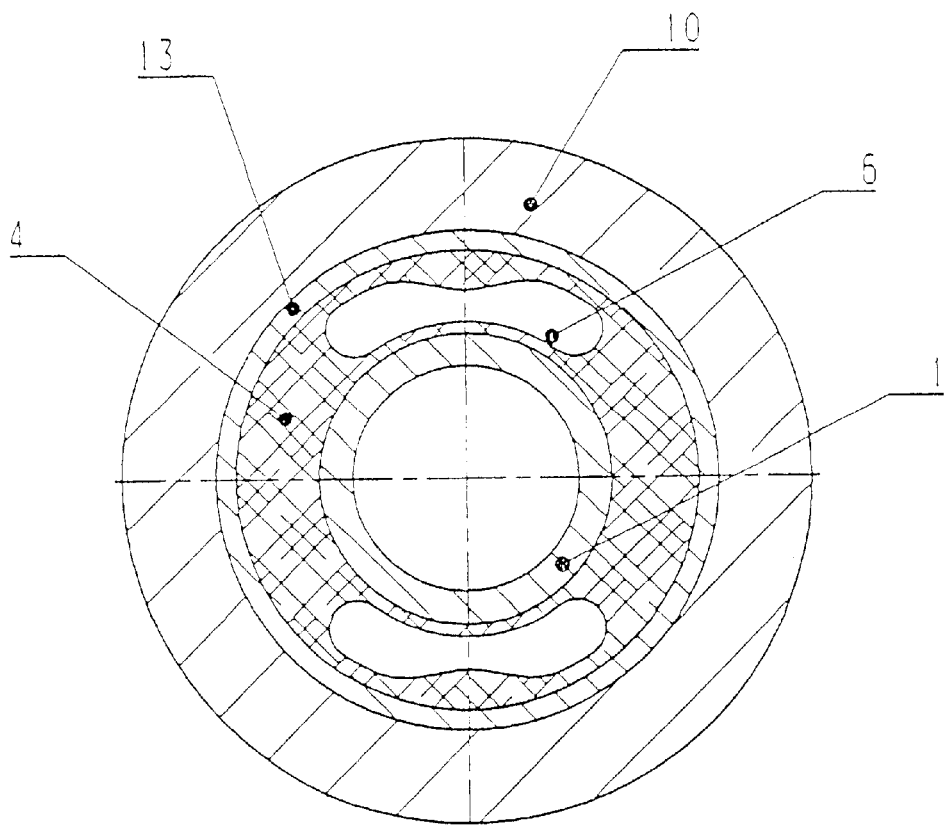
FIG. 4 is a known bearing with different characteristics.

Referring to the drawings in particular, FIG. 1 shows the general design of the bearing according to the present invention in a sectional view. The elastomer 4 is arranged around the inner part and is connected to the inner part by vulcanization. To obtain a softer characteristic in the y direction, the elastomer 4 has recesses 6. The parts forming the bearing are mounted in a cylindrical mounting eye 10 before their intended use (see FIG. 2b). The mounting is carried out without an outer ring 13 surrounding the bearing. Such an outer ring 13 surrounding the bearing is used in known arrangements with great differences in characteristic, an example of which is shown in FIG. 4. Due to the design according to the present invention, such a stabilization measure is not necessary. Due to the design of the inner part, pretensioned areas are generated in the elastomer after its mounting in the mounting eye 10. A relative movement under load, between the elastomer and the mounting eye, especially due to twisting of the component, is prevented as a result. The elastomer 4 can rotate at most in itself by a small amount under a corresponding load. As can be recognized, the inner part 1 has a tubular inner contour 2 and an outer contour 3 of an elliptical shape in this case. This ellipse is flattened at the ends of its major axis 7. Due to the described design of the inner part 1, the rubber height resulting after the mounting in the mounting eye 10 is reduced in the area of the recesses 6. Due to the design of the inner part 1, the elastomer 4 has increased pretension in these areas. To obtain a softer characteristic in the y direction, it is important for the inner part 1 and the elastomer 4 connected thereto to be designed such that the recesses 6 will also be preserved after the mounting in the mounting eye 10 or mounting tube.

In the example shown, the major and minor axes 7, 8 of the inner part 1 have a length ratio of 3:2. As a result, the ratio of the characteristics in the y and x directions will be 2:1 if an elastomer 4 possessing usual material properties is used. The measure taken leads to a markedly softer characteristic in the area of the recesses 6, without the elastomer 4 being overstressed in this area. Such a characteristic ratio cannot be obtained without the use of a stabilizing outer part in the case of the prior-art design of the bearing corresponding to the state of the art. Without an outer part, the characteristic in the area of the recesses is usually softer by at most 20% in bearings according to the state of the art.

Figure 2A:
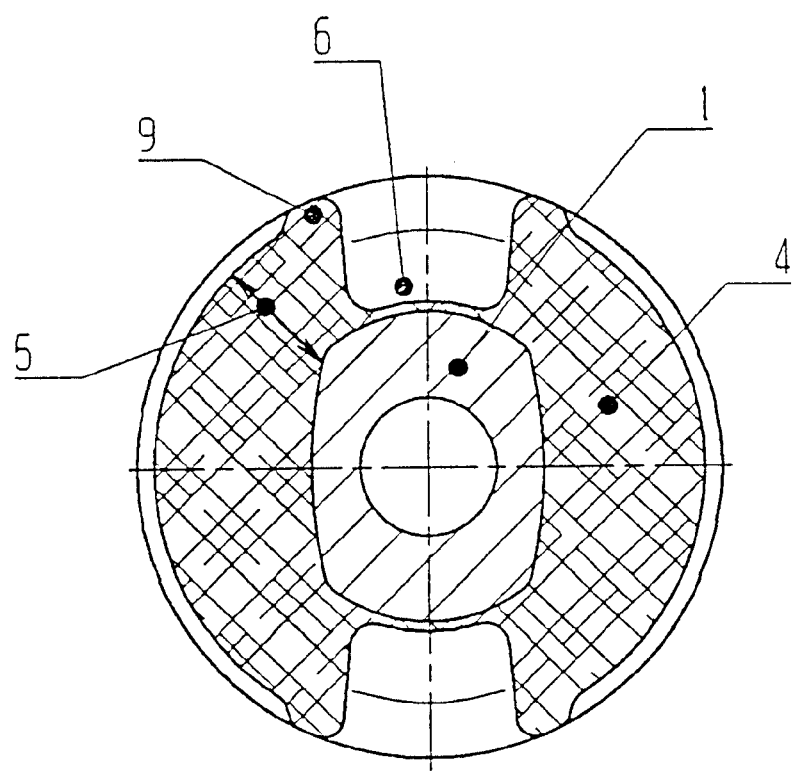
FIG. 2a is a schematic sectional view of a variant of the bearing according to the present invention with increased rubber height in the vicinity of the recesses.

FIG. 2a shows a variant of the bearing according to the present invention, in which the outer contour of the elastomer 4 is additionally modified besides the change made in the shape of the inner part 1. The rubber height or elastomer thickness 5 of the elastomer 4 is increased such that the elastomer 4 with the enclosed inner part 1 has an external diameter before mounting that is greater than the internal diameter of the mounting eye 10. In the embodiment shown, the outer contour 11 of the elastomer 4 additionally has a bulge 9 each in locally limited areas in the vicinity of the recesses, by which the elastomer thickness (the radial dimension of the elastomer) 5 is additionally increased in this area before the mounting in the mounting eye 10. A buffer is obtained as a result in these areas, which has a travel-limiting effect and leads to an additional stabilization of the elastomer 4 as a result. It is also conceivable to finely coordinate the characteristics of the bearing in this manner. However, the elastomer 4 also has a reduced elastomer thickness 5 in the area of the buffers 9 due to the necessary compression in the mounted state compared with the areas offset by 90° in relation to the recesses. The principle of the present invention is thus preserved if it is ensured that the recesses are also present after the mounting.

Figure 2B:
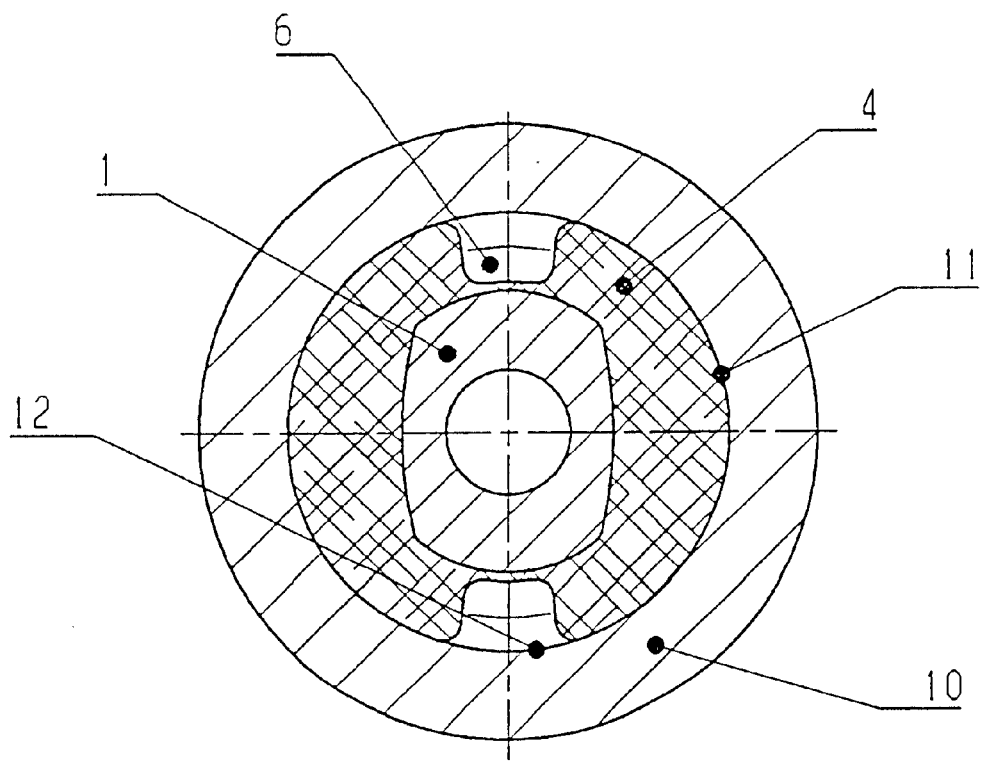
FIG. 2b is the bearing according to FIG. 2a after mounting in the mount.

FIG. 2b shows the bearing according to FIG. 2a once again after mounting in the mounting eye 10. As can be recognized, the arrangement has approximately the same appearance as in FIG. 1. Only the recesses 6 are somewhat smaller because of the elastomer 4 being compressed in the areas of increased elastomer thickness.

Figure 3:
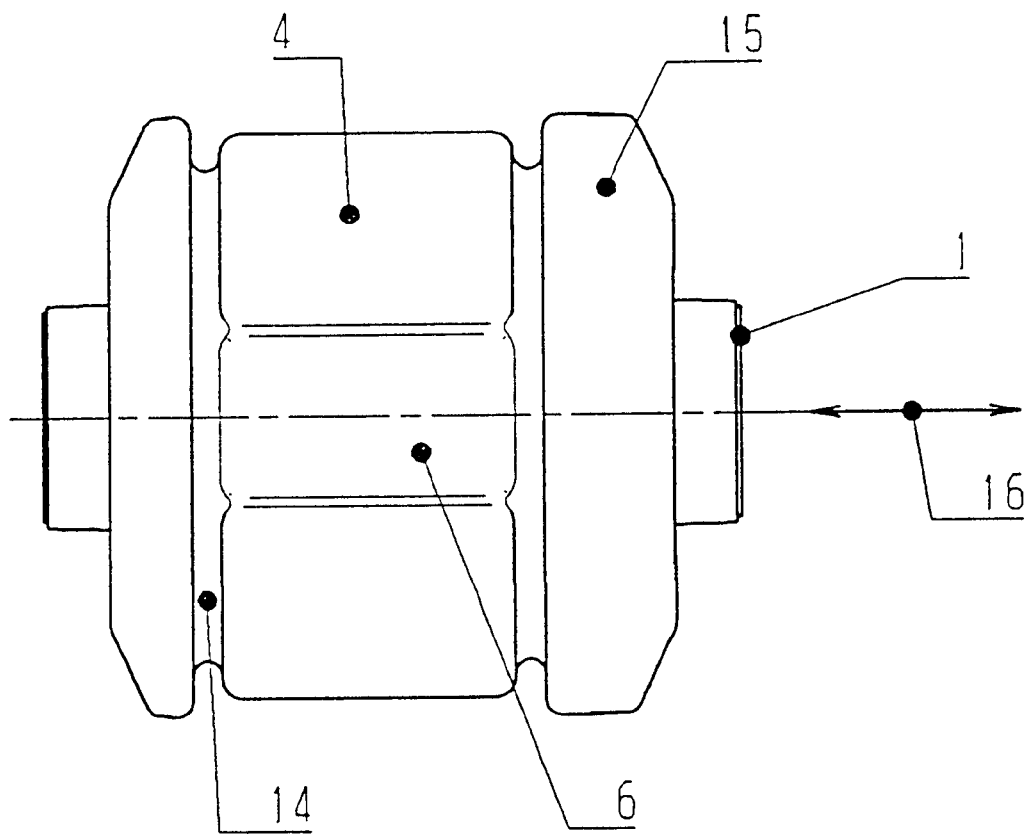
FIG. 3 is a side view of the bearing according to the present invention.

FIG. 3 shows a side view of the bearing according to the present invention. The design of the elastomer 4 with the recesses 6 incorporated in it is clearly recognizable. Since the air that is contained in the recesses 6 even after the mounting in the mounting eye 10 is compressed in this area under the effect of the radial force, channels 14 are provided in the edge area of the bearing to prevent an increased pressure from building up, and the air can escape through these channels 14 to the respective opposite recess 6. The axial extension (in the axial direction 16) of the bearing shown is increased beyond the axial length of the mounting eye 10, not shown in the FIG. 3. The outer areas 15 of the elastomer 4 projecting from the mounting eye 10 after the mounting have an increased diameter compared with the bearing body proper. As a result, the bearing introduced into the mounting eye 10 is protected from contaminants penetrating from the outside in the manner of a seal. This design variant offers, in principle, the possibility of additionally introducing a liquid damping agent into the recesses 6, which form cavities limited by the inner contour 12 of the mounting eye 10 after mounting in the mounting eye 10 to influence the damping characteristic. Assuming, of course, a sufficient sealing of the bearing to the outside, this can also flow to and fro via the channels 14 between the recesses 6 under loads.

FIG. 4 shows for comparison the design of a bearing with variable characteristics according to the state of the art. As can be recognized, recesses 6 are also provided in this bearing in the elastomer 4 to influence the characteristics. However, due to the cylindrical shape of the bearing inner part 1, the elastomer is subject to increased stress in the area of the recesses in the particular case. To avoid crushing and a reduction of the service life of the elastomer 4, the elastomer 4 is therefore surrounded by a stabilizing ring 13.

While specific embodiments of the invention have been shown and described in detail to illustrate the application of the principles of the invention, it will be understood that the invention may be embodied otherwise without departing from such principles.

What is claimed is:

1. A rubber bearing with different characteristics in the circumferential direction, the bearing for mounting in a cylindrical mounting eye, the bearing comprising:
    an inner part with an outer contour with a cross-sectional area having a shape deviating from a circular shape; and
    an elastomer with an essentially cylindrical outer contour, which surrounds said inner part and is connected to said inner part by vulcanization, said elastomer having recesses in some areas of an outer peripheral surface to obtain circumferential sections with soft characteristic, and said elastomer having an elastomer thickness with the bearing mounted in the mounting eye without a stabilizing outer part, said elastomer thickness varies corresponding with the cross section of said inner part, said inner part having a greatest radial extension in an area of said recesses with an increased pretension in said areas of said recesses, said elastomer having a smallest elastomer thickness in an area of said recesses.

2. A rubber bearing in accordance with claim 1, wherein said inner part has a substantially rectangular cross-sectional shape with short sides of this rectangular cross-sectional shape arched outwardly in the radial direction in an arc-shaped pattern and the cross-sectional area has a major axis with maximum material height of said inner part in the radial direction and a minor axis with minimal material height of said inner part in the radial direction.

3. A rubber bearing in accordance with claim 1, wherein said inner part has a shape of an ellipse, which is flattened at the ends of its said major axis.

4. A rubber bearing in accordance with claim 2, wherein said ratio of said major and minor axes is 3:2 and the bearing has a characteristic ratio of 2:1.

5. A rubber bearing in accordance with claim 3, wherein said ratio of major and minor axes is 3:2 and the bearing has a characteristic ratio of 2:1.

6. A rubber bearing in accordance with claim 2, wherein the ratio of said major and minor axes is 26:17 and the bearing has a characteristic ratio of 2:1.

7. A rubber bearing in accordance with claim 3, wherein the ratio of major and minor axes is 26:17 and the bearing has a characteristic ratio of 2:1.

8. A rubber bearing in accordance with claim 1, wherein said elastomer has an increased elastomer thickness in some areas, as a result of which the external diameter of said elastomer is greater before mounting in the mounting eye than an internal diameter of the mounting eye, wherein said recesses are preserved in said elastomer after mounting and said elastomer has a greatest elastomer thickness in an area adjacent to said recesses.

9. A rubber bearing in accordance with claim 8, wherein said elastomer has locally limited, outwardly directed bulges in the vicinity of said recesses provided in said elastomer, and said elastomer has said increased elastomer thickness compared with adjoining areas in the area of said bulges, said bulges forming a buffer with an additional travel-limiting effect against radial loads after mounting in the mounting eye during the intended use of the bearing.

10. A rubber bearing in accordance with claim 1, further comprising one or more channels, which connect said recesses to one another are defined in an outer contour of said elastomer.

11. A rubber bearing in accordance with claim 10, further comprising a liquid damping agent introduced into said recesses, said recesses forming a chamber between said elastomer and the inner contour of said mounting eye.

12. A rubber bearing in accordance with claim 11, wherein said elastomer is extended in an axial direction beyond an axial extent of the mounting eye in edge areas and said elastomer has a slightly increased external diameter compared with an internal diameter of the mounting eye in said edge areas, said edge areas being located outside said mounting eye after mounting, as a result of which the bearing is sealed against possible contaminants.

13. A rubber bearing in accordance with claim 10, wherein:
    said channel is movable of fluid present in one said recess to an opposite one of said recesses under action of a radial force in the area of one of said recesses.

14. A rubber bearing assembly, comprising:
    a cylindrical mounting eye; and
    a bearing comprising:
        an inner part with an outer contour, said inner part having a cross-sectional area with a shape deviating from a circular shape; and
        an elastomer with an essentially cylindrical outer contour, said elastomer surrounding said inner part and being connected to said outer contour of said inner part by vulcanization, said elastomer having an outer peripheral surface in contact with said mounting eye, said outer peripheral surface having areas defining recesses to obtain circumferential sections with soft characteristic, said bearing being mounted in said mounting eye without a stabilizing outer part, said elastomer having an elastomer radial extent from said outer contour of said inner part, with the bearing mounted, that varies corresponding to the cross section of said inner part, said inner part having a greatest radial extent in an area of said recesses with an increased pretension in said areas of said recesses, said elastomer having a smallest radial extent from said outer contour of said inner part in said areas of said recesses.

15. A rubber bearing in accordance with claim 14, wherein said elastomer has an increased elastomer thickness in some areas, as a result of which the external diameter of said elastomer is greater before mounting in the mounting eye than an internal diameter of the mounting eye, wherein said recesses are preserved in said elastomer after mounting and said elastomer has a greatest elastomer thickness in an area adjacent to said recesses.

16. A rubber bearing in accordance with claim 15, wherein said elastomer has locally limited, outwardly directed bulges in the vicinity of said recesses provided in said elastomer, and said elastomer has said increased elastomer thickness compared with adjoining areas in the area of said bulges, said bulges forming a buffer with an additional travel-limiting effect against radial loads after mounting in the mounting eye during the intended use of the bearing.

17. A rubber bearing in accordance with claim 14, further comprising:
    a channel defined in said outer contour of said elastomer, said channel being in communication with two of said recesses.

18. A rubber bearing in accordance with claim 17, further comprising a liquid damping agent introduced into said recesses, said recesses forming a chamber between said elastomer and the inner contour of said mounting eye.

19. A rubber bearing in accordance with claim 14, wherein said elastomer is extended in an axial direction beyond an axial extent of the mounting eye in edge areas and said elastomer has a slightly increased external diameter compared with an internal diameter of the mounting eye in said edge areas, said edge areas being located outside said mounting eye after mounting, as a result of which the bearing is sealed against possible contaminants.

20. A rubber bearing in accordance with claim 14, wherein:

said outer contour of said elastomer is in direct contact with an inner surface of said cylindrical mounting eye;

said elastomer circumferentially surrounds said inner part.

\* \* \* \* \*